US006814680B2

(12) United States Patent
Younger

(10) Patent No.: US 6,814,680 B2
(45) Date of Patent: Nov. 9, 2004

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 10/360,576

(22) Filed: Feb. 7, 2003

(65) Prior Publication Data

US 2003/0153425 A1 Aug. 14, 2003

Related U.S. Application Data

(60) Provisional application No. 60/356,097, filed on Feb. 11, 2002.

(51) Int. Cl.[7] ............................................... F16H 3/00
(52) U.S. Cl. ..................................................... 475/116
(58) Field of Search ................................. 475/116, 128, 475/129

(56) References Cited

U.S. PATENT DOCUMENTS

| 4,449,426 | A | * | 5/1984 | Younger | 477/127 |
|---|---|---|---|---|---|
| 4,711,140 | A | * | 12/1987 | Younger | 477/156 |
| 4,790,938 | A | * | 12/1988 | Younger | 210/484 |
| 4,930,080 | A | * | 5/1990 | Suzuki | 701/66 |
| 5,090,270 | A | * | 2/1992 | Suzuki | 477/117 |
| 5,253,549 | A | * | 10/1993 | Younger | 475/146 |
| 5,538,480 | A | * | 7/1996 | Torimoto | 475/129 |
| 5,540,628 | A | * | 7/1996 | Younger | 475/120 |
| 5,624,342 | A | * | 4/1997 | Younger | 475/127 |
| 5,730,685 | A | * | 3/1998 | Younger | 477/156 |
| 5,743,823 | A | * | 4/1998 | Younger | 475/120 |
| 5,768,953 | A | | 6/1998 | Younger | |
| 5,820,507 | A | * | 10/1998 | Younger | 475/116 |
| 5,967,928 | A | * | 10/1999 | Younger | 475/120 |
| 6,099,429 | A | * | 8/2000 | Younger | 475/120 |
| 6,117,047 | A | * | 9/2000 | Younger | 477/130 |
| 6,287,231 | B1 | * | 9/2001 | Younger | 475/120 |
| 6,390,944 | B1 | * | 5/2002 | Younger | 475/127 |
| 6,565,472 | B1 | * | 5/2003 | Younger | 475/116 |

* cited by examiner

Primary Examiner—Dirk Wright
(74) Attorney, Agent, or Firm—Mark P. Stone

(57) ABSTRACT

The present invention is directed to methods and systems for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to adjust the feel or firmness of upshifts of the transmission perceived by drivers and occupants of vehicles having the modified transmissions.

18 Claims, 8 Drawing Sheets

US 6,814,680 B2

METHODS AND SYSTEMS FOR IMPROVING THE OPERATION OF TRANSMISSIONS FOR MOTOR VEHICLES

This application claims the benefit of provisional application Ser. No. 60/356,097, filed Feb. 11, 2002.

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the "E40D" which is "factory installed" in automotive vehicles manufactured by Ford Motor Company.

The present inventor owns U.S. Pat. No. 5,253,549, issued Oct. 19, 1993 and entitled "Methods And Systems For Improving The Operation Of Automatic Transmissions For vehicles"; U.S. Pat. No. 4,790,938, issued on Dec. 13, 1988 and entitled "Filter For Removing particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission"; U.S. Pat. No. 5,540,628, issued Jul. 30, 1996 and entitled "Methods And Systems For Improving The Operation Of Transmissions For Motor Vehicles"; and U.S. Pat. No. 5,624,342, issued on Apr. 29, 1997; U.S. Pat. No. 5,730,685, issued on Mar. 24, 1998; U.S. Pat. No. 5,743,823, issued on Apr. 28, 1998; U.S. Pat. No. 5,768,953, issued on Jun. 23, 1998; U.S. Pat. No. 5,820,507, issued on Oct. 13, 1998; U.S. Pat. No. 5,967,928, issued on Oct. 19, 1999; U.S. Pat. No. 6,099,429, issued on Aug. 8, 2000; U.S. Pat. No. 6,117,047, issued on Sep. 12, 2000; U.S. Pat. No. 6,287,231, issued on Sep. 11, 2001; and U.S. Pat. No. 6,390,944, issued on May 21, 2002. The basic operation of transmissions for automotive vehicles and improvements thereto, are discussed in the aforementioned patents, and these patents are expressly incorporated by reference into the disclosure of the present patent application.

The basic principles of operation of the factory installed Ford Motor Company transmission for automotive vehicles, including the specific modes of operation thereof and the hydraulic circuits and interrelationship of hydraulic circuits, are well known to those skilled in the automotive transmission art. Attention is respectfully invited to the text entitled *E40D Automatic Transmission Reference Manual* (1992) published by The Ford Motor Company, said publication describing in detail the operation of the "factory installed" E40D Ford transmission, including a discussion of the structure, the hydraulic circuits, and the interrelationship between the structure and the hydraulic circuitry and fluid flow during normal operation of the transmissions in automotive vehicles. The disclosure of the aforementioned publication in its entirety is expressly incorporated by reference into the disclosure of the present patent application as disclosing and illustrating background material known to those of ordinary skill in the automotive transmission art. Additionally, the "factory installed" E40D automotive transmission is disclosed in a publication entitled 1995–1996 *Transmission Service & Repair, Domestic Cars, Light Tricks & Vans*, Published by Mitchell, said publication also being expressly incorporated by reference herein.

Aforementioned U.S. Pat. No. 5,768,953, issued on Jun. 23, 1998, discloses improvements and modifications to the "factory installed" E4OD automotive transmission. The disclosure of U.S. Pat. No. 5,768,953 is expressly incorporated by reference herein.

A primary object of the present invention is to provide further improvements and modifications to the "factory installed" E4OD transmission in addition to those disclosed in U.S. Pat. No. 5,768,953.

SUMMARY OF THE INVENTION

The primary object of the present invention is to modify the "factory installed" E4OD transmission to provide a mechanic with flexibility in adjusting the feel of 1–2, 2–3, and 3–4 upshifts. The "factory installed" E4OD transmission is found in a wide variety of vehicles, anywhere from six cylinder engines in one half ton pick-up trucks to powerful diesel engines and two and one half commercial chassis. The original calibration system in the "factory installed" transmission is not adjusted to conform to the specific vehicle in which the transmission is installed. This has resulted in complaints from owners of the lighter duty vehicles (6 cylinder one half ton trucks) of upshifts which are too firm, and has also resulted in complaints from owners of the heavier duty vehicles (diesel engine two and one half ton commercial chassis) of too soft upshifts.

In accordance with the present invention, a new separator plate is installed in the E4OD "factory installed" transmission between the front accumulator body and the case of the transmission. The original factory installed E4OD transmission provided full flow of oil pressure to each of the accumulator and capacity valve trains regulating each shifting clutch, namely the intermediate clutch, the direct clutch, and the overdrive clutch. The separator plate installed with the present invention provides orifices in the flow path of fluid leading into each of the intermediate, direct, and overdrive clutches for the purpose of controlling the fluid pressure applied to each clutch. Preferably, the orifice for controlling the fluid flow is 0.055 inches in diameter. The provision of orifices in the fluid flow channels coupled to the shifting clutch apply circuit for each of the intermediate, direct, and overdrive clutches controls, in series, controls the fluid pressure applied to each of the respective intermediate, direct, and overdrive shifting clutches. This, in turn, contols the "feel" of upshifts perceived by the occupants of the vehicle in which the modifications to the "factory installed" transmission have been made. The size of the orifices provided in the fluid flow channels coupled to the intermediate, direct, and overdrive clutches can be varied by the mechanic to selectively adjust the degree of firmness or smoothness of the "feel" of the shift.

DESCRIPTION OF THE BEST MODES FOR CARRYING OUT THE INVENTION

Figure 1A:
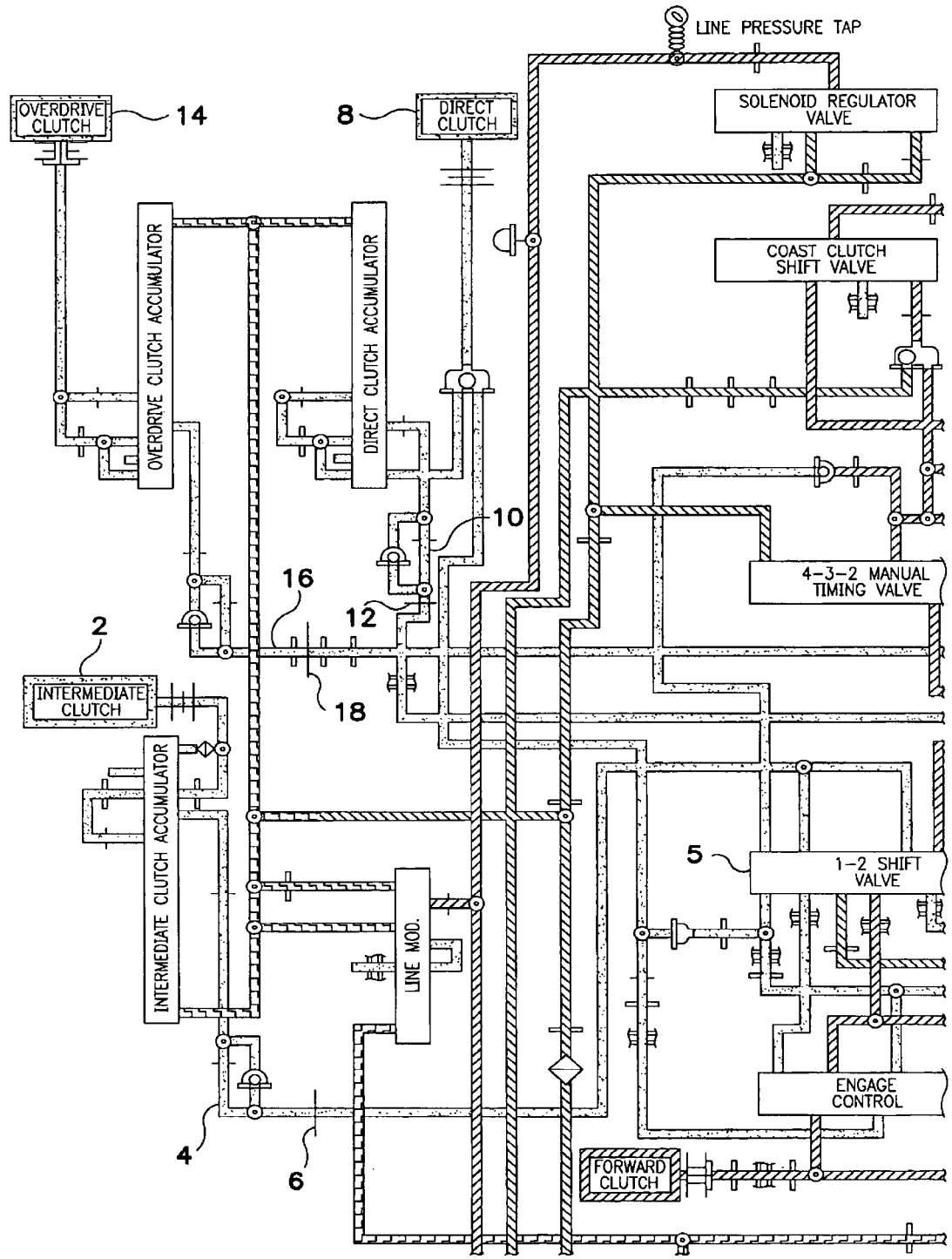
FIG. 1 illustrates hydraulic circuitry of the E4OD automotive transmission in "4th Gear (TCC OFF—"OD" Range)" illustrating some of the improvements in accordance with the present invention.
Figure 1B:
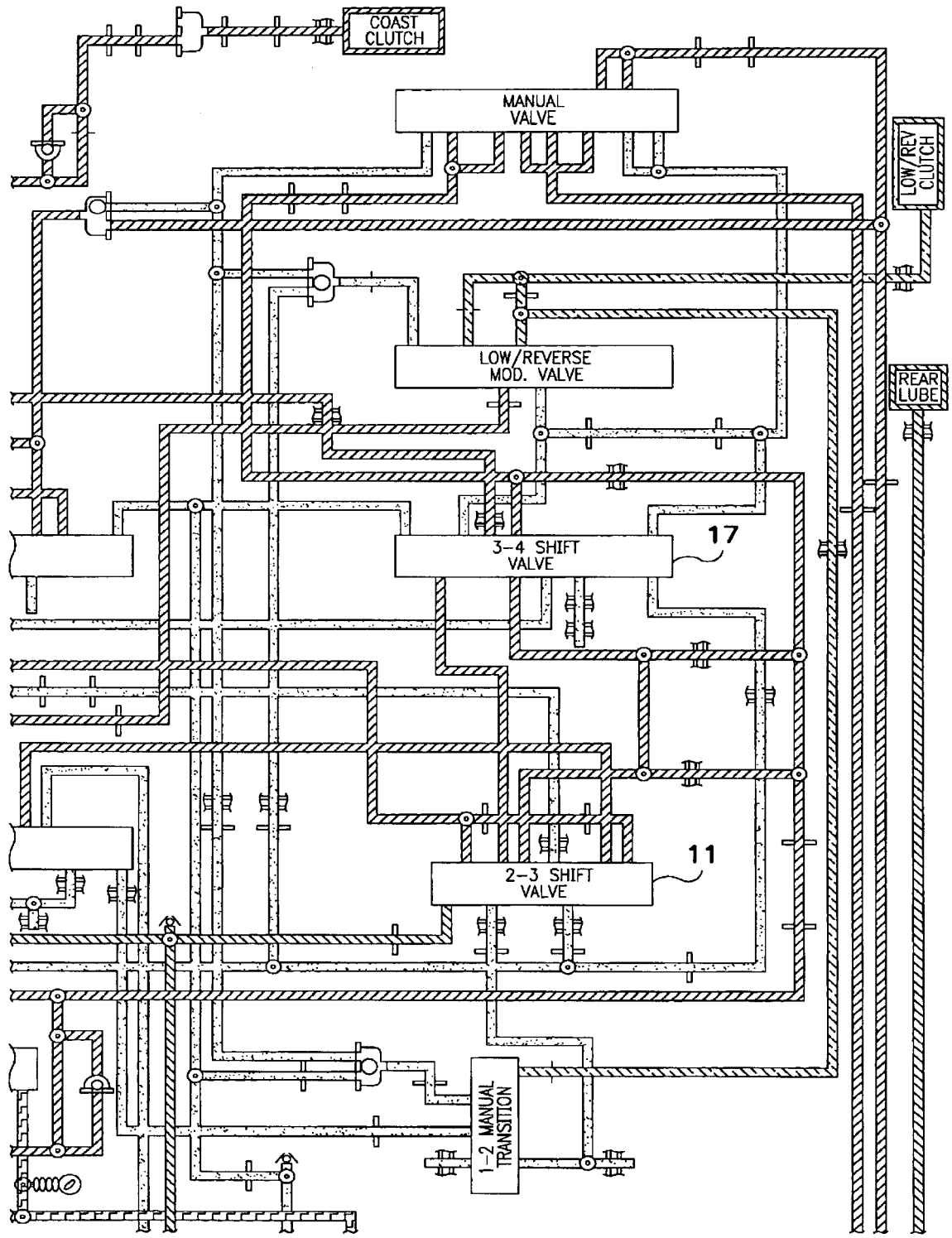
Figure 1C:
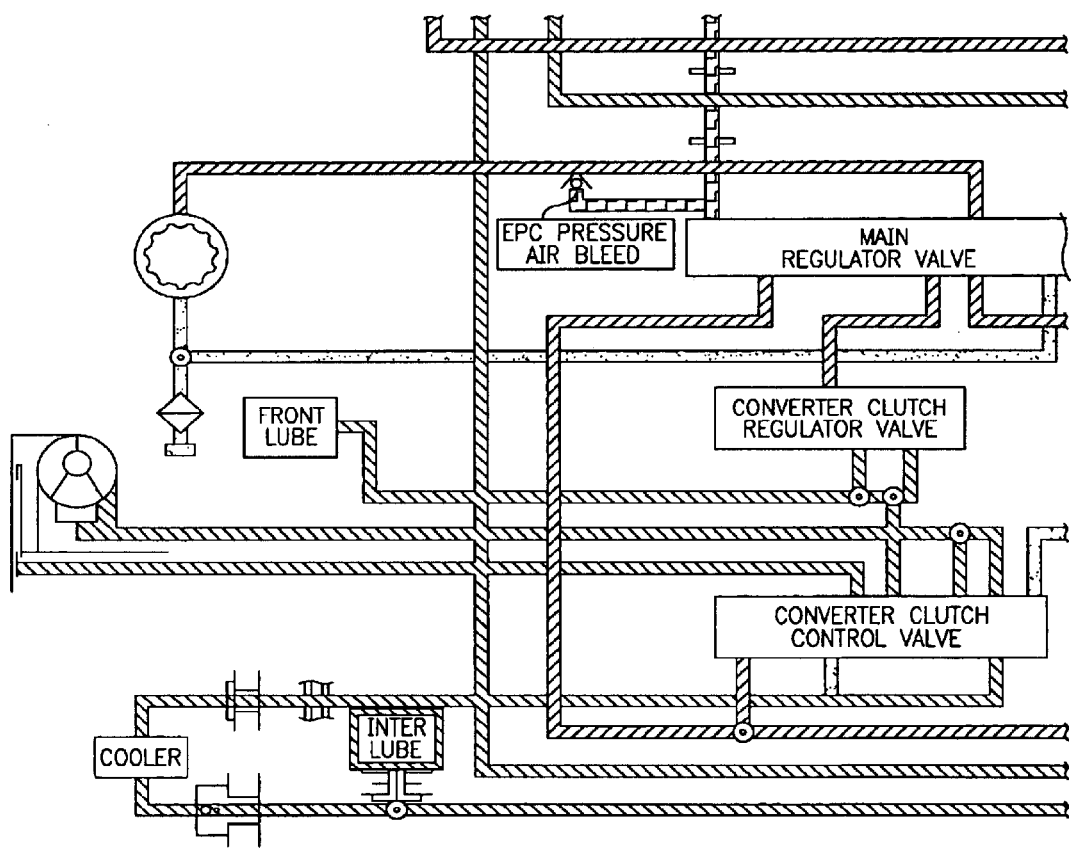
Figure 1D:
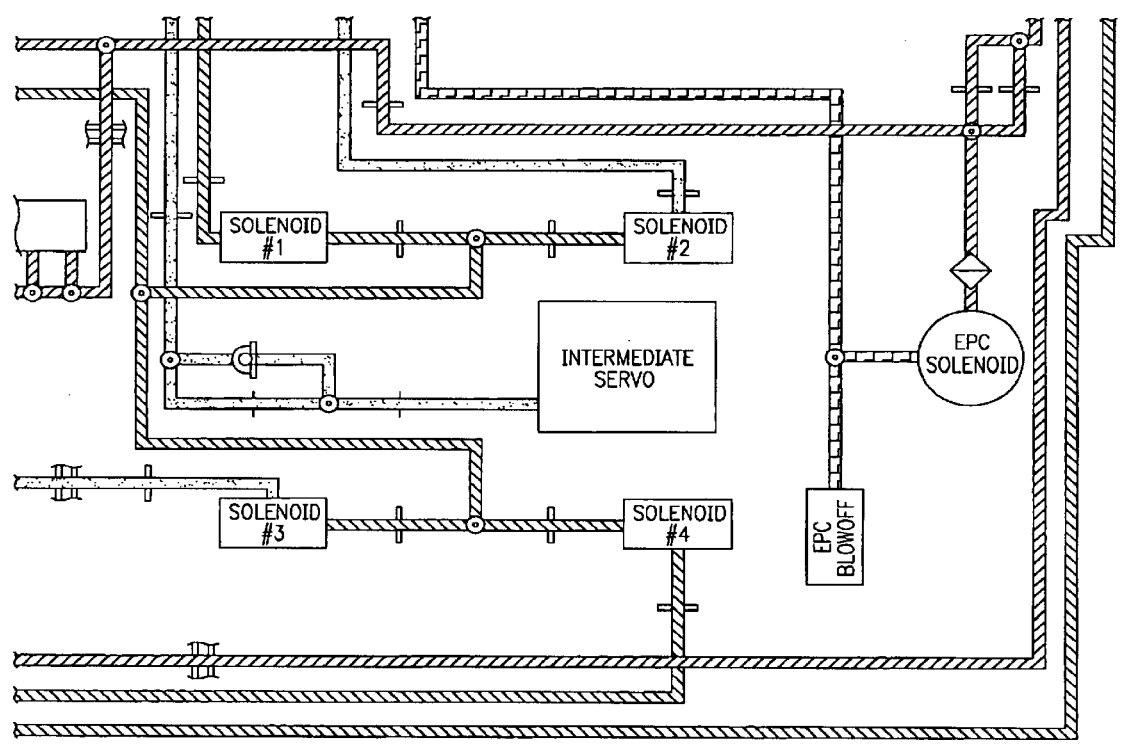

FIG. 1 of the drawing illustrates an intermediate clutch designated by reference numeral 2, and a fluid flow channel designated by reference numeral 4, coupled to the intermediate clutch. Fluid flow channel 4 couples the intermediate clutch 2 to a "1–2" shift valve designated generally by reference numeral 5 in FIG. 1. An orifice designated by reference numeral 6 is provided in the fluid flow channel 4 to control the fluid flow, and fluid pressure, applied to the intermediate clutch through fluid flow channel 4.

Figure 2A:
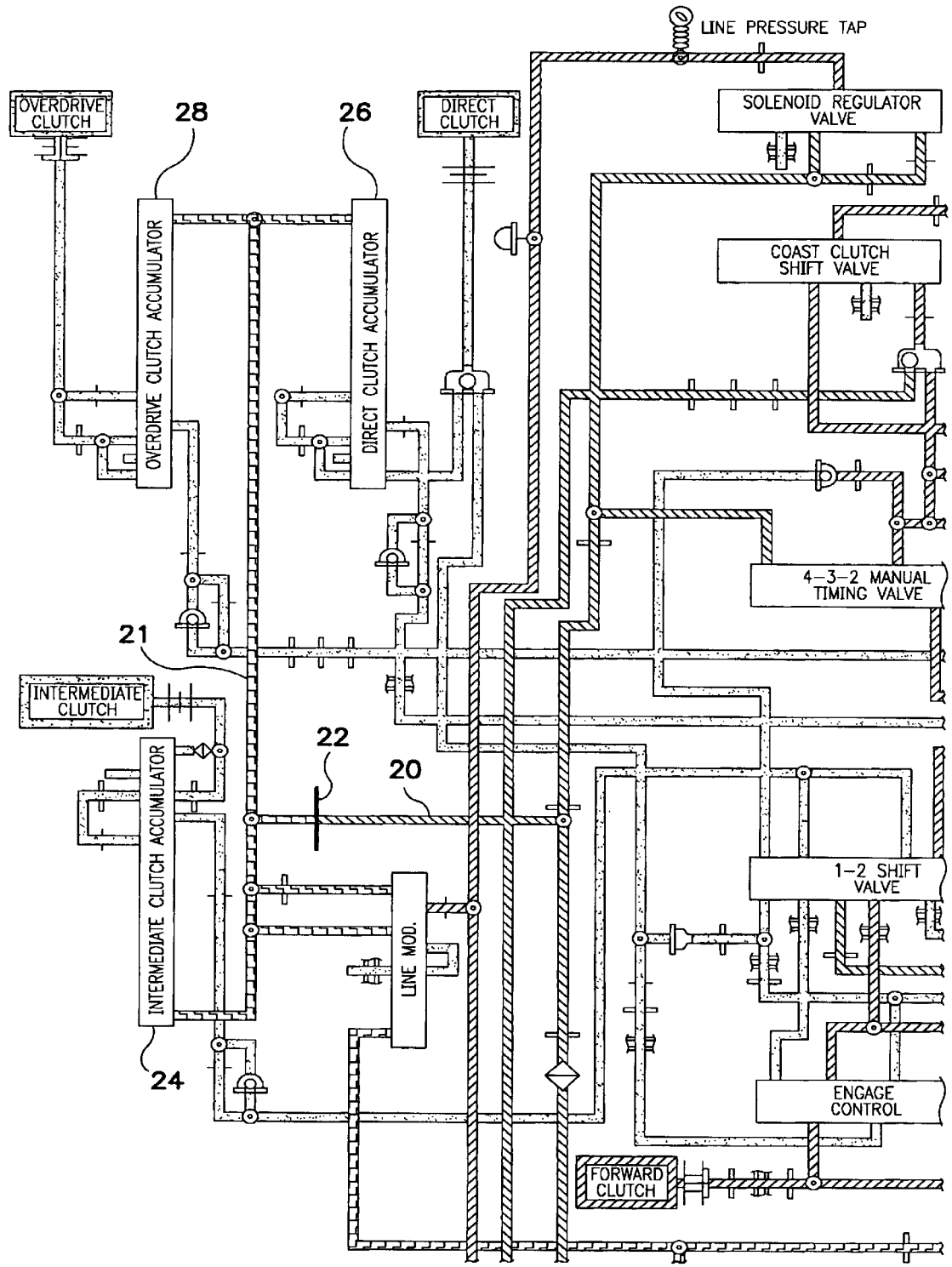
FIG. 2 of the drawing illustrates hydraulic circuitry for the E4OD automotive transmission in "Reverse—"R" Range" illustrating additional improvements in accordance with the present invention.
Figure 2B:
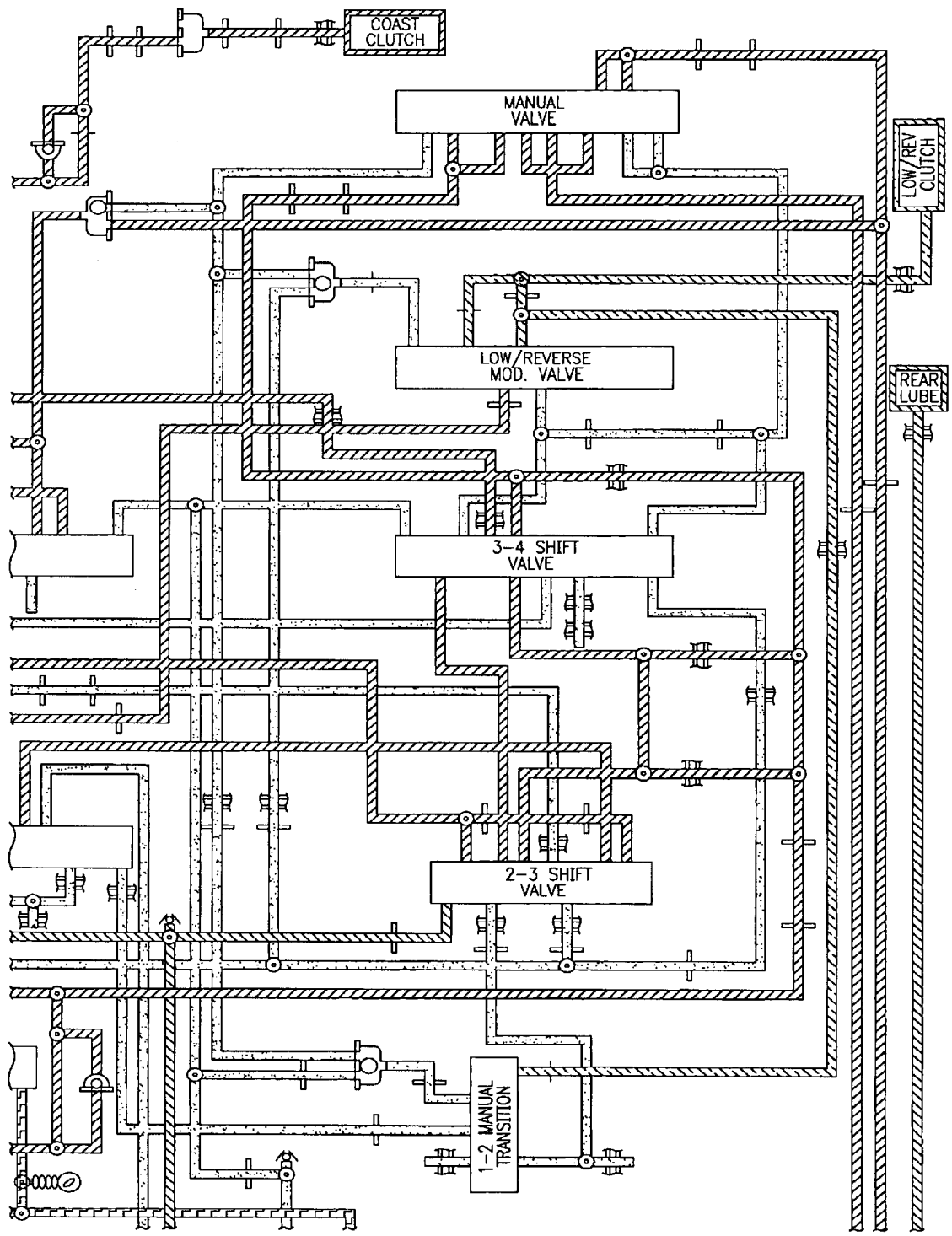
Figure 2C:
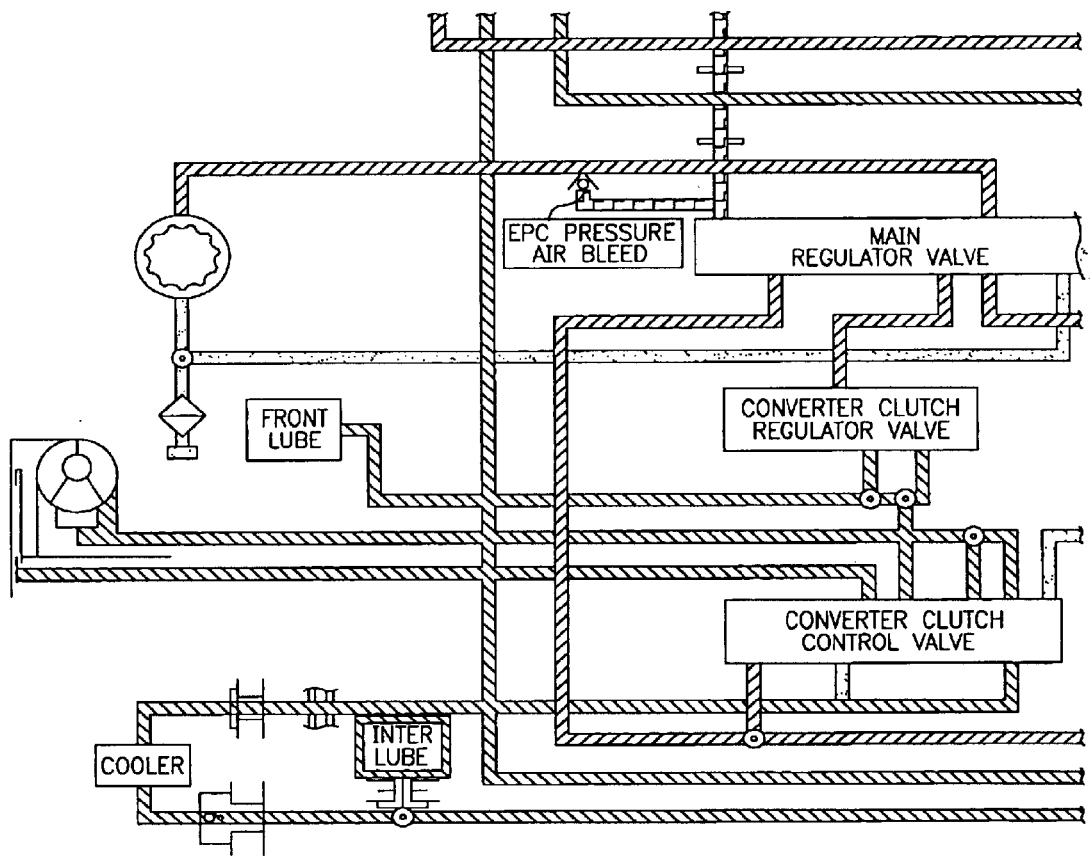
Figure 2D:
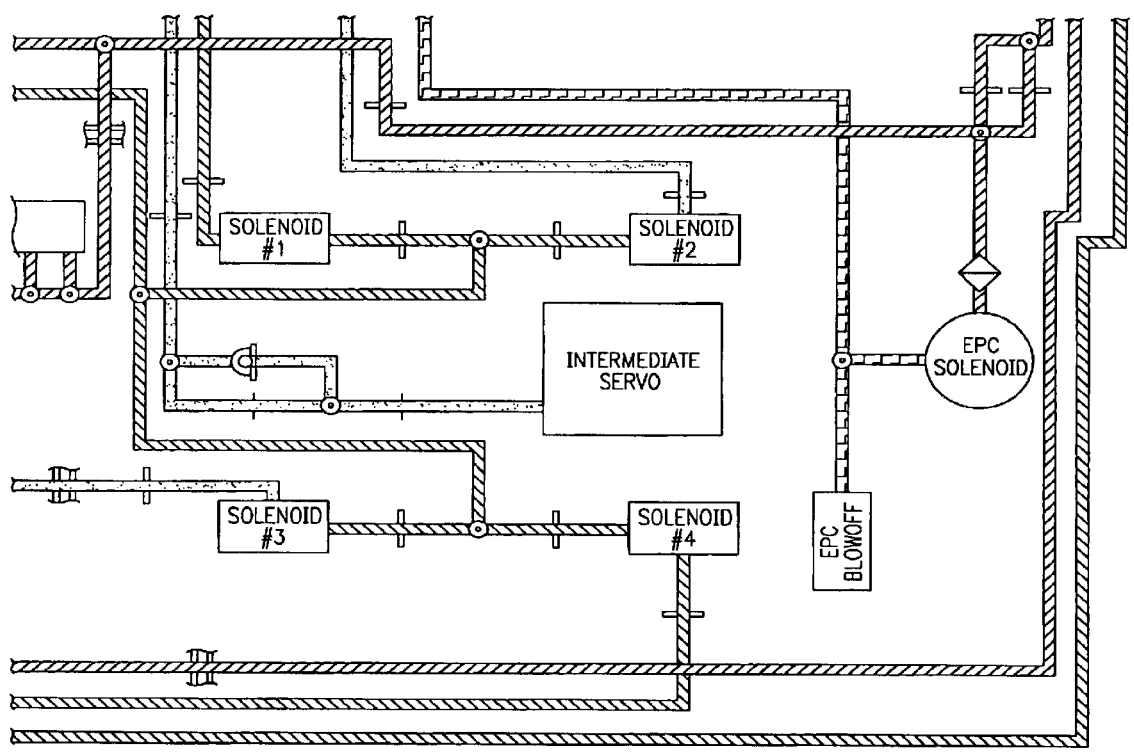

FIG. 1 of the drawing also illustrates a direct clutch designated by reference numeral 8, and a fluid flow channel designated by reference numeral 10, coupled to the direct clutch. Fluid flow channel 10 couples the direct clutch 8 to a "2–3" shift valve designated generally by reference numeral 11 in FIG. 2. An orifice designated by reference numeral 12 is provided in the fluid flow channel 10 to control the fluid flow, and fluid pressure, applied to the direct clutch through fluid flow channel 10.

FIG. 1 of the drawing also illustrates an overdrive clutch designated by reference numeral 14, and a fluid flow channel designated by reference numeral 16, coupled to the overdrive clutch. Fluid flow channel 16 couples the overdrive clutch 14 to a "3–4" shift valve designated generally by reference numeral 17 in FIG. 2. An orifice designated by reference numeral 18 is provided in the fluid flow channel 16 to control the fluid flow, and fluid pressure, applied to the overdrive clutch through fluid flow channel 16.

By selectively adjusting and controlling the fluid flow into the intermediate clutch 2, and/or the direct clutch 8, and/or the overdrive clutch 14, the "feel" of 1–2, 2–3, and 3–4 upshifts of the "factory installed" E4OD automotive transmission perceived by the occupants of the vehicle can be adjusted so that firmer upshifts are softened, and softer upshifts are firmed.

FIG. 2 illustrates a further modification to the factory installed E4OD automotive transmission, in accordance with a further aspect of the present invention. In the "factory installed" E4OD transmission, there is a direct fluid leak in line pressure to a sump. The hydraulic circuitry of the "factory installed" E4OD transmission deliberately bleeds off line pressure in a fluid flow channel, designated by reference numeral 20, through an opening or orifice in a gasket for that channel at the location designated by reference numeral 22. Fluid flow channel 20 intersects channel 21 which couples an intermediate clutch accumulator 24, a direct clutch accumulator 26, and an overdrive clutch accumulator 28 in fluid communication. The new separator plate installed in accordance with the improvements to the "factory installed" transmission discussed above, also blocks the orifice in fluid flow channel 20, thereby preventing fluid from bleeding from the line 20. The blockage of this orifice in the "factory installed" E4OD transmission significantly reduces a delayed reverse application which is commonly experienced with the "factory installed" E4OD transmission when the transmission is put in reverse gear, particularly when the engine is operating at a hot slow idle speed.

Other modifications and improvements within the scope of the invention will become apparent to those skilled in the relevant art. Accordingly, the discussion of the preferred embodiments of the invention herein is intended to be illustrative only, and not restrictive of the scope of the invention, that scope being defined by the following claims and all equivalents thereto.

What is claimed is:

1. A method of modifying the hydraulic circuitry of a factory installed automotive transmission having an intermediate clutch coupled to a 1–2 shift valve by a first fluid flow passageway, a direct clutch coupled to a 2–3 shift valve by a second fluid flow passageway, and an overdrive clutch coupled to a 3–4 shift valve by a third fluid flow passageway, the steps of said method comprising:

adjusting the rate of fluid flow through at least one of said first, second or third fluid flow passageways for adjusting the fluid pressure applied to at least one of said intermediate, direct or overdrive clutches.

2. The method as claimed in claim 1 wherein said step of adjusting comprises adjusting the fluid flow through said first fluid flow passageway for controlling the 1–2 shift valve.

3. The method as claimed in claim 1 wherein said step of adjusting comprises adjusting the fluid flow through said second fluid flow passageway for controlling the 2–3 shift valve.

4. The method as claimed in claim 1 wherein the step of adjusting comprises the step of adjusting the fluid flow through the third fluid flow passageway for controlling the 3–4 shift valve.

5. The method as claimed in claim 1 wherein the step of adjusting comprises adjusting each of the first, second, and third fluid flow passageways for controlling each of the 1–2, 2–3, and 3–4 shift valves.

6. The method as claimed in claim 1 wherein said hydraulic circuitry of said factory installed automatic transmission includes an overdrive accumulator, a direct clutch accumulator, and an intermediate clutch accumulator in fluid communication with each other through fluid flow passageway means, said fluid flow passageway means having an opening for providing a controlled leak of fluid therefrom, the steps of said method comprising:

blocking the leak in said fluid flow passageway means.

7. The method as claimed in claim 6 wherein the step of blocking said leak comprises the step of reducing the delay in application of a reverse shift when the automotive transmission is placed in a reverse gear.

8. The method as claimed in claim 1 wherein said step of adjusting the rate of fluid flow through at least one of said first, second or third fluid flow passageways includes the step of providing an orifice in said at least one of said first, second or third fluid flow passageways.

9. The method as claimed in claim 6 wherein the step of blocking the leak in said fluid flow passageway includes the step of providing a plate for blocking an orifice in said passageway means through which fluid leaks from said fluid flow passageway means.

10. A method of modifying the hydraulic circuitry of a factory installed automatic transmission having an overdrive cluch accumulator, a direct clutch accumulator, and an intermediate clutch accumulator in fluid communication with each other through fluid flow passageway means, said fluid flow passageway means having an opening for providing a controlled leak of fluid therefrom, the steps of said method comprising:

blocking the leak in said fluid flow passageway means.

11. The method as claimed in claim 10 wherein the step of blocking said leak comprises the step of reducing the delay in application of a reverse shift when the automotive transmission is placed in a reverse gear.

12. The method as claimed in claim 10 wherein said hydraulic circuitry of said factory installed automotive transmission includes an intermediate clutch coupled to a 1–2 shift valve by a first fluid flow passageway, a direct clutch coupled to a 2–3 shift valve by a second fluid flow passageway, and an overdrive clutch coupled to a 3–4 shift valve by a third fluid flow passageway, the steps of said method comprising:

adjusting the rate of fluid flow through at least one of said first, second or third fluid flow passageways for adjusting the fluid pressure applied to at least one of said intermediate, direct or overdrive clutches.

13. The method as claimed in claim 12 wherein said step of adjusting comprises adjusting the fluid flow through said first fluid flow passageway for controlling the 1–2 shift valve.

14. The method as claimed in claim 12 wherein said step of adjusting comprises adjusting the fluid flow through said second fluid flow passageway for controlling the 2–3 shift valve.

15. The method as claimed in claim 12 wherein the step of adjusting comprises the step of adjusting the fluid flow through the third fluid flow passageway for controlling the 3–4 shift valve.

16. The method as claimed in claim 12 wherein the step of adjusting comprises adjusting each of the first, second, and third fluid flow passageways for controlling each of the 1–2, 2–3, and 3–4 shift valves.

17. The method as claimed in claim 12 wherein said step of adjusting the rate of fluid flow through at least one of said first, second or third fluid flow passageways includes the step of providing an orifice in said at least one of said first, second or third fluid flow passageways.

18. The method as claimed in claim wherein the step of blocking the leak in said fluid flow passageway includes the step of providing a plate for blocking an orifice in said passageway means through which fluid leaks from said fluid flow passageway means.

* * * * *

UNITED STATES PATENT AND TRADEMARK OFFICE
CERTIFICATE OF CORRECTION

PATENT NO.   : 6,814,680 B2
DATED        : November 9, 2004
INVENTOR(S)  : Gilbert W. Younger It is certified that error appears in the above-identified patent and that said Letters Patent is hereby corrected as shown below:

<u>Column 6,</u>
Line 9, after "claim", add -- 10 --.

Signed and Sealed this

Fifteenth Day of February, 2005

JON W. DUDAS
*Director of the United States Patent and Trademark Office*